(12) United States Patent
Bass et al.

(10) Patent No.: US 7,120,630 B2
(45) Date of Patent: Oct. 10, 2006

(54) FULL MATCH (FM) SEARCH ALGORITHM IMPLEMENTATION FOR A NETWORK PROCESSOR

(75) Inventors: Brian Mitchell Bass, Apex, NC (US); Jean Louis Calvignac, Cary, NC (US); Marco C. Heddes, Raleigh, NC (US); Antonios Maragkos, Raleigh, NC (US); Piyush Chunilal Patel, Cary, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/650,397

(22) Filed: Aug. 28, 2003

(65) Prior Publication Data

US 2005/0177552 A1    Aug. 11, 2005

Related U.S. Application Data

(62) Division of application No. 09/543,531, filed on Apr. 6, 2000, now Pat. No. 6,675,163.

(51) Int. Cl.
G06F 7/00 (2006.01)
H04L 12/56 (2006.01)

(52) U.S. Cl. .................. 707/6; 707/3; 707/100; 707/104.1; 370/401; 370/356

(58) Field of Classification Search ............... 707/2–5, 707/100–104.1, 6; 370/389, 392, 335, 395, 370/401, 356
See application file for complete search history.

(56) References Cited

U.S. PATENT DOCUMENTS

| | | | |
|---|---|---|---|
| 5,121,495 A | 6/1992 | Nemes | 395/600 |
| 5,418,947 A | 5/1995 | Hsu et al. | 395/600 |
| 5,546,390 A * | 8/1996 | Stone | 370/408 |
| 5,594,899 A | 1/1997 | Knudsen et al. | 395/600 |
| 5,787,430 A | 7/1998 | Doeringer et al. | 707/100 |

(Continued)

FOREIGN PATENT DOCUMENTS

EP    0 520 116 A1 *    6/1991

(Continued)

OTHER PUBLICATIONS

Willibald Doeringer, Gunter Karjoth and Mehdi Nassehi—"Routing on Longest-Matching Prefixes" IEEE/ACM Transactions on Networking (TON), vol. 4, Issue 1, Feb. 1996, pp. 86-97.*

(Continued)

*Primary Examiner*—Jean M. Corrielus
*Assistant Examiner*—Anh Ly
(74) *Attorney, Agent, or Firm*—Joscelyn G. Cockburn

(57) ABSTRACT

Novel data structures, methods and apparatus for finding a full match between a search pattern and a pattern stored in a leaf of the search tree. A key is input, a hash function is performed on the key, a direct table (DT) is accessed, and a tree is walked through pattern search control blocks (PSCBs) until reaching a leaf. The search mechanism uses a set of data structures that can be located in a few registers and regular memory, and then used to build a Patricia tree structure that can be manipulated by a relatively simple hardware macro. Both keys and corresponding information needed for retrieval are stored in the Patricia tree structure. The hash function provides an n->n mapping of the bits of the key to the bits of the hash key.

9 Claims, 12 Drawing Sheets

U.S. PATENT DOCUMENTS

| | | | |
|---|---|---|---|
| 5,815,737 A * | 9/1998 | Buckland | 370/397 |
| 5,819,291 A | 10/1998 | Haimowitz et al. | 707/201 |
| 5,857,196 A * | 1/1999 | Angle et al. | 707/102 |
| 5,893,086 A | 4/1999 | Schmuck et al. | 707/1 |
| 5,918,225 A | 6/1999 | White et al. | 707/3 |
| 5,940,396 A * | 8/1999 | Rochberger | 370/408 |
| 5,946,676 A * | 8/1999 | Iggulden | 707/1 |
| 5,946,679 A | 8/1999 | Ahuja et al. | |
| 5,978,795 A * | 11/1999 | Poutanen et al. | 707/3 |
| 6,161,144 A * | 12/2000 | Michels et al. | 370/392 |
| 6,266,706 B1 * | 7/2001 | Brodnik et al. | 709/242 |
| 6,347,085 B1 * | 2/2002 | Kelly | 370/401 |
| 6,396,842 B1 * | 5/2002 | Rochberger | 370/408 |
| 6,404,752 B1 * | 6/2002 | Allen et al. | 370/389 |
| 6,430,527 B1 * | 8/2002 | Waters et al. | 707/3 |
| 6,456,625 B1 * | 9/2002 | Itoi | 370/401 |
| 6,522,632 B1 * | 2/2003 | Waters et al. | 370/408 |
| 6,553,002 B1 * | 4/2003 | Bremer et al. | 370/351 |
| 6,560,640 B1 * | 5/2003 | Smethers | 709/219 |
| 6,789,116 B1 * | 9/2004 | Sarkissian et al. | 709/224 |
| 6,836,771 B1 * | 12/2004 | Brown | 707/3 |
| 2001/0043602 A1 * | 11/2001 | Brown | 370/392 |

FOREIGN PATENT DOCUMENTS

| | | |
|---|---|---|
| EP | 0419889 A2 | 3/1999 |
| GB | 2350534 A | 11/2000 |
| JP | 02-260334 | 10/1990 |
| JP | 05-167640 | 7/1993 |
| JP | 10-162013 | 6/1998 |
| JP | 10162013 | 6/1998 |
| JP | 10-257066 | 9/1998 |
| JP | 2002-024293 | 1/2002 |
| WO | 96/00945 | 1/1996 |
| WO | 01/16779 A1 | 3/2001 |

OTHER PUBLICATIONS

Masanori Uga & Kohei Shiomoto—"A Fast and Compact Longest Match Prefix Look-up Method Using Pointer Cache for Very Long Network Address" IEEE, CCN, Oct. 11-13, 1999, pp. 595-602.*

Kenshin Yamada et al., "Address Resolution Engine for IP Routing", Technical Report of IEICE, SSE98-72, IN98-53(2), CS98-69(Sep. 1998).

Shingo Ata et al. "Study on Efficient Cache Structures Providing Policy-Based Services in IP Routers", Technical Report of IEICE, CS99-155, CQ99-78(Feb. 2000).

* cited by examiner

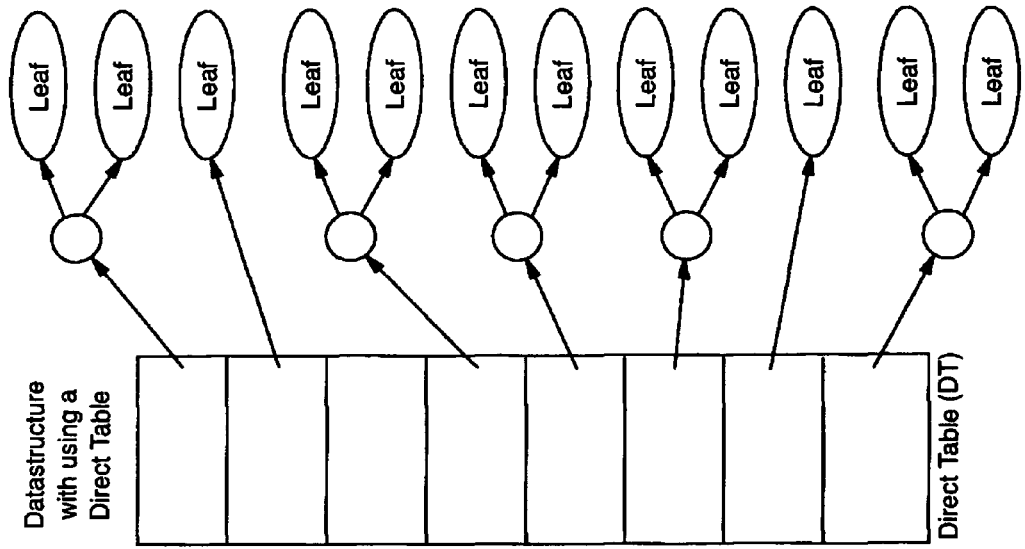
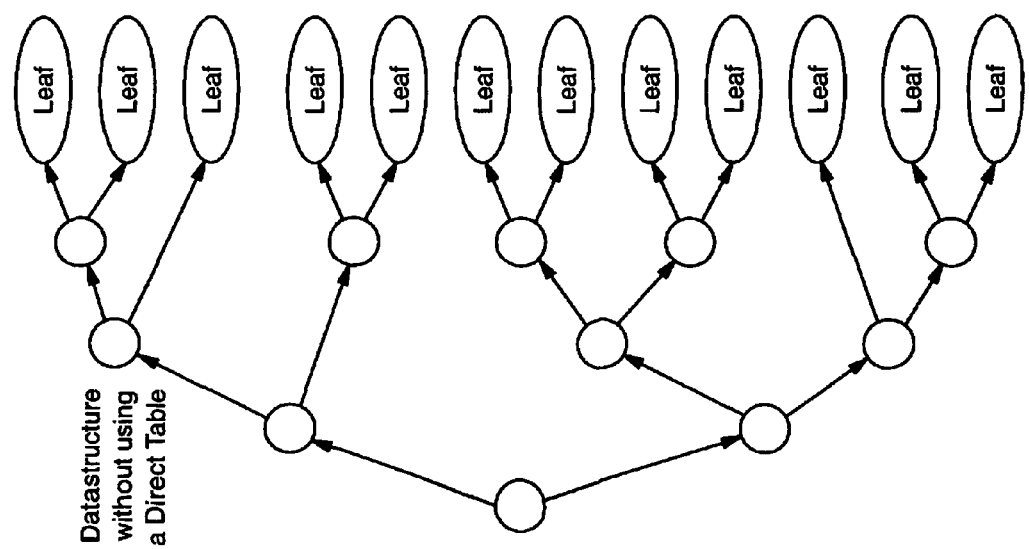
FIG. 6

FIG. 7
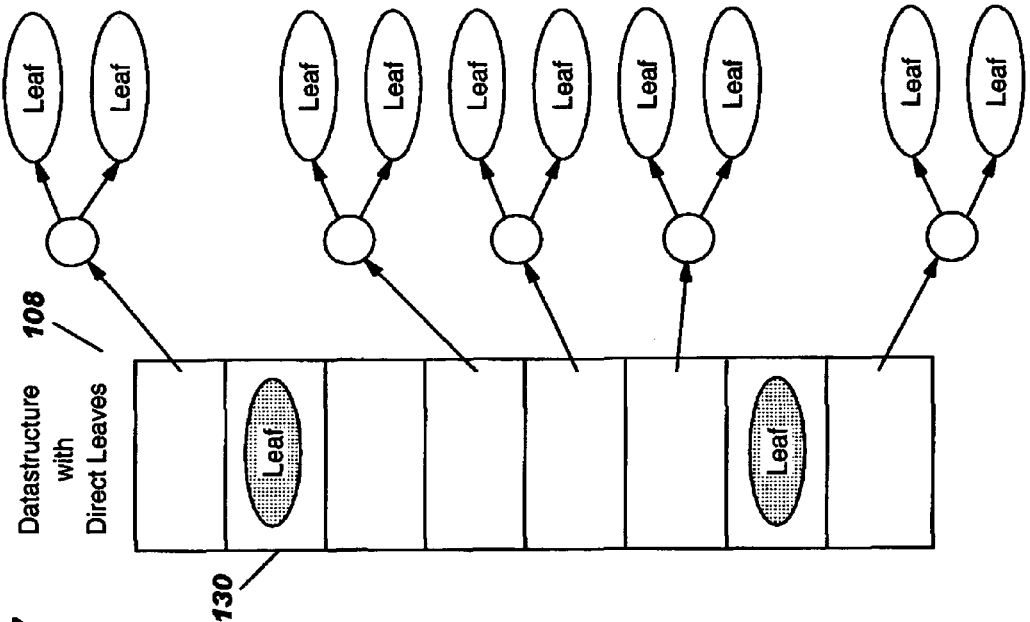
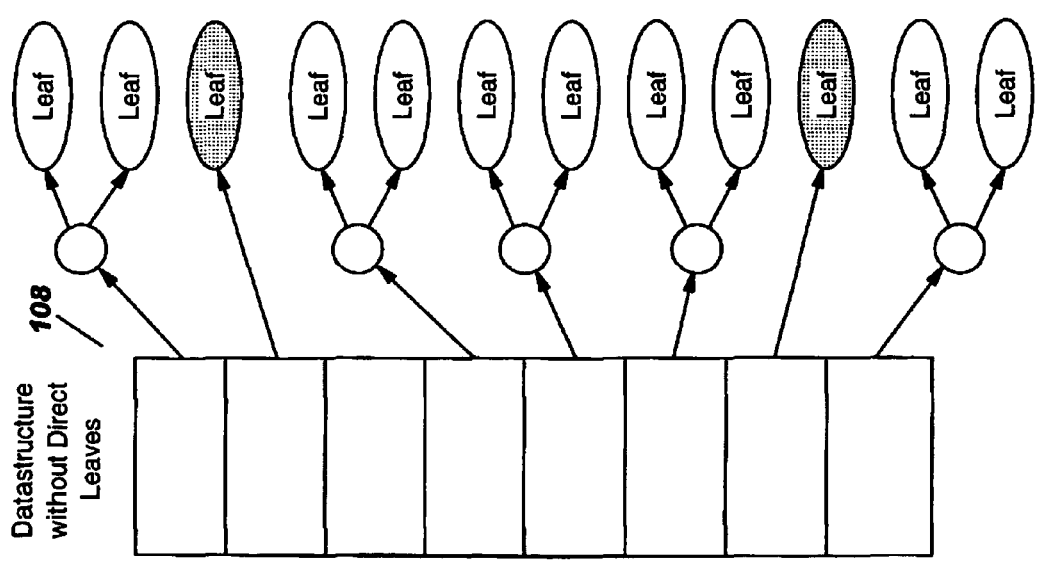

| Format | Conditions | Valid in DTEntry? | Valid in PSCB? | Format (2bits) | NPA/LCBA (26 bits) | NBT (8 bits) |
|---|---|---|---|---|---|---|
| Empty DTEntry | No leaves | Yes | No | 00 | 0 | 0 |
| Pointer to next PSCB | DtEntry contains pointer | Yes | Yes | 00 | NPA | NBT |
| Pointer to leaf | Single leaf associated with DTEntry; LCBA field contains pointer | Yes | Yes | 01 | LCBA | 0 |

FIG. 11

LUDefTable Tree Definition

| Field | Size | Bits |
|---|---|---|
| CacheEntry | 1 | 0 |
| Tree_Type | 2 | 2..1 |
| hash-type | 4 | 6..3 |
| color_en | 1 | 7 |
| P1P2_max_size | 5 | 12..8 |
| NPARope_en | 1 | 13 |
| NPASMT_en | 1 | 14 |
| CompIndex_en | 1 | 15 |
| PSCB_fq_index | 6 | 21..16 |
| PSCB_Height | 1 | 22 |
| Mask_Vector_En | 1 | 23 |
| CompIndex | 8 | 31..24 |
| DT_base_addr | 26 | 57..32 |
| DT_size | 4 | 61..58 |
| DT_interleaf | 2 | 63..62 |
| Leaf_fq_index | 6 | 69..64 |
| Leaf_Width | 2 | 71..70 |
| Leaf_Height | 3 | 74..72 |
| DirectLeafEn | 1 | 75 |

FIG. 12

| Field | Size | Address in TSM where PSCB is located |
|---|---|---|
| NPA0 | 26 | Next PSCB address: pointer to next PSCB in the tree for 0-part of PSCB |
| NBT0 | 8 | Next bit to test for 0-part of PSCB |
| LCBA0 | 26 | Leaf control block address: pointer to leaf for 0-part of PSCB |
| NPA1 | 26 | Next PSCB address: pointer to next PSCB in the tree for 1-part of PSCB |
| NBT1 | 8 | Next bit to test for 1-part of PSCB |
| LCBA1 | 26 | Leaf control block addess: pointer to leaf for 1-part of PSCB |
| Index | 8 | Index of this PSCB (physically stored in the previous PSCB) |
| PatBit | 1 | The value of HashedKey[Index], based on the value of the Index field in the PSCB register |

FIG. 13

| Field Name | Length | Description |
|---|---|---|
| NLARope | 4 bytes | Leaf chaining pointer, aging information and direct leaf information |
| Prefix_Len | 1 byte | This field is not used by the TSE for FM trees and can be used by picocode |
| pattern | 2 - 18 bytes | Pattern to be compared with the HashedKey |
| UserData | variable | The contents of this field is under complete picocode control; the UserData field can include one or more counters |

FULL MATCH (FM) SEARCH ALGORITHM IMPLEMENTATION FOR A NETWORK PROCESSOR

This divisional application claims priority of application Ser. No. 09/543,531 filed Apr. 6, 2000 now U.S. Pat. No. 6,675,163.

CROSS-REFERENCE TO RELATED APPLICATIONS

This application is related to, and contain common disclosures with, co-pending and commonly assigned patent applications "Network Processor Processing Complex and Methods", Ser. No. 09/384,691, filed Aug. 27, 1999; "Longest Prefix Match (LPM) Algorithm Implementation for a Network Processor", Ser. No. 09/544,992; and "Software Management Tree Implementation for a Network Processor", Ser. No. 09/545,100. Each co-pending patent application is hereby incorporated by reference into this description as fully as if here represented in full.

BACKGROUND OF THE INVENTION

The present invention relates generally to pattern matching algorithms and, more particularly, to a full matching search algorithm that can be implemented in a network processing device.

The demand for hardware-integrated processing to support more and more complex tasks at media speed has led to the creation of network processors. Network processors provide wirespeed frame processing and forwarding capability with function flexibility through a set of embedded, programmable protocol processors and complementary system coprocessors. Network processors are expected to become the fundamental network building block for networks in the manner that microprocessors are for today's personal computers. Network processors offer real-time processing of multiple data streams, providing enhanced security and IP packet handling and forwarding capabilities. In addition, they provide speed improvements through advanced architectures, such as parallel distributed processing and pipeline processing designs. These capabilities can enable efficient search engines, increased data handling throughput, and provide rapid execution of complex tasks. The programmable features of network processors provide network product developers an easier migration path to implement new protocols and technologies without requiring new custom Application Specific Integrated Circuit (ASIC) designs.

Network processors provide a highly customizable, scalable technology for the development of interconnect solutions for Internet or enterprise network providers. A network processor provides the basis for a wide range of solutions from a low-end, stand-alone device to a large multirack solution. Scaling of this nature is accomplished through the use of high performance, non-blocking packet routing switch technology and proprietary interfaces such as IBM Corporation's Data Aligned Serial Link (DASL) interface which can be adapted to other industry switch technologies.

As a programmable communications integrated circuit, the network processor provides very efficient packet classification, multi-table lookups per frame, packet modification, queue/policy management, and other packet processing capabilities. The network processor integrates a switching engine, search engine, frame processors and Ethernet MACs on one device to support the needs of customers who require high capacity, media weight switching frames based on frame content at any protocol layer.

Hardware accelerators perform frame forwarding, frame filtering and frame alteration. The network processor's ability to enforce hundreds of rules with complex range and action specifications sets a new benchmark for filtering capabilities, making a network processor-based system uniquely suited for high capacity server farm applications.

A typical system developed with a network processor uses a distributed software model, with each programmable network processor executing tasks concurrently. Some functions are performed in the control point (CP) processor, which can be internal or external to the network processor. The CP provides support for layer 2 and layer 3 routing protocols, and layer 4 and layer 5 network applications and systems management. Wirespeed forwarding and filtering functions are performed by a combination of the network processor hardware and resident picocode.

In communication networks, comprising a number of interconnected nodes, data can be sent from one node to any other node or network. Specialized nodes called routers are responsible for forwarding the data to their destinations. Any data sent through a communication network contains information about the destination address, generally as part of a header. Each router compares this information, or at least part of it, with a list of addresses stored internally. If a match is found between stored addresses and the destination address, the router establishes a path leading to the destination node. Depending on the network size and structure, the data are either directly forwarded to their destination or sent to another intermediate router. The International Organization for Standardization (ISO) promulgated a routing standard in which a router stores routing information for partial addresses. The router then sends the packet to the best matching partial address it has in its database. The ISO standard allows a hierarchal structure of nodes to be built using a given number of digits or a given header length. Main routers are addressed by the initial part of the address, subrouters by the middle part, and the final destination by the last digits of the address. Therefore, it is sufficient for any router to read the digits assigned to the level of the hierarchy to which the data are to be sent.

The routing of the receive packet is based on the accompanying address string. The address string is used as a search key in a database which contains the address string along with other pertinent details such as which router is next in a delivery of a packet. The database is referred to as a routing table, while the link between the current router and the next router is called the next hop in the progress of the packet. The routing table search process depends on the structure of the address as well as the organization of the tables. For example, a search key of a size less than 8 bits and having a nonhierarchal structure would most efficiently be found in a routing table organized as a series of address entries. The search key would be used as an index in the table to locate the right entry. For a search key of a larger size, say thirty-two bits, the corresponding routing table may have more than 10,000 entries. Organizing the database as a simple table to be searched directly by an index would waste a large amount of memory space, because most of the table would be empty.

Conventional routers break up the search process into several steps. The first step is to determine whether the router is directly connected to the destination host computer. In this case, the message is one hop from the destination and should be routed in that direction. If the destination computer is not directly connected to the router, the next step is to determine the topological direction of the destination network. If the direction is determined from the topological layout, the message is routed that way. Otherwise, the final step is to route the message along a default link.

Typically, the first step is performed using a linear search through a table containing the thirty-two bit addresses of host computers directly connected to the router. Reflecting the local topology, each entry in the address table is connected to a corresponding output interface leading directly to the addressed computer. When a destination address is received by a router, the full thirty-two bits are compared with each of the destination addresses in a table. If a match is found, the message is sent directly to the corresponding destination via the specified router interface.

The second step, that of determining the direction of the destination network, is not usually performed by a linear search through a table since the number of network addresses would make such a table difficult to manage and use. In the prior art, when address strings conformed to the three-level hierarchy of network address, subnet address and host identification, routers performed the determination using one of several well-known techniques, such as hashing, Patricia-tree searching, and multilevel searching. In hashing, a hash function reduces the network portion of the address, producing a small, manageable index. The hash index is used to index a hash table and to search for a matching hash entry. Corresponding to each hash entry of the hash table is the address of an output interface pointing in the topological direction of a corresponding network. If a match is found between the hash network portion and a hash entry, the message is directed towards the corresponding interface and destination network.

Hashing reduces a large, unmanageable field to a small manageable index. In the process, however, there is a chance that two or more fields may generate the same hash index. This occurrence is referred to as a collision, since these fields must be stored in the same location in the hash table. Further searching is needed to differentiate the entries during a collision. Therefore, collisions reduce the efficiency obtained from using the hashing search, and in the worst case, where all permissible addresses reduce to a single index, hashing is rendered practically useless as a search process.

Patricia-tree searching avoids the collisions encountered by hashing methods. This method of searching requires that all address strings and accompanying information, such as related route information, be stored in a binary tree. Starting from the most significant bit position within the address string, the search process compares the address, bit by bit, with the tree nodes. A matched bit value guides the search to visit either the left or the right child node and the process is repeated for the next bit of the address. The search time is proportional to the size of the longest address string stored. In Patricia-tree searching, the difference between the average search time and the worst case search time is not very large. In addition, the routing table is organized quite efficiently. It requires less memory than comparable routing tables of hashing methods. Patricia-tree searching handles the worst case searches better than the hashing methods, but in most cases it takes significantly longer to locate a match. Therefore, many conventional routers use a combination of hashing and Patricia-tree searching. This combination is called multilevel searching.

Multilevel searching joins hashing with Patricia-tree searching. A cache stores a hash table containing a subset of the most recently, and presumably most commonly, routed network addresses, while a Patricia-tree stores the full set of network addresses. As the message is received, the destination address is hashed onto the table. If it is not located within a pre-determined period of time, the address is passed to the Patricia-tree search engine which insures that the address, if stored, will be found.

In the prior art, there are a number of known tree search algorithms including fixed match trees, longest prefix match trees and software managed trees. Fixed match trees are used for fixed size patterns requiring an exact match, such as layer 2 Ethernet MAC tables. Longest prefix match trees are used for variable length patterns requiring only partial matches, such as IP subnet forwarding. Software managed trees are used for patterns that are defined as ranges or bit masks, such as filter rules. In general, lookup is performed with the aid of a tree search engine (TSE).

SUMMARY OF THE INVENTION

It is an object of this invention to provide for the implementation in hardware of a Full Match tree search algorithm for Patricia trees. It describes how the memory structures are set up so that they can serve the purpose of the algorithm, and how the hardware processes these structures.

Another object of the invention is to provide a search mechanism that does not require storage on the previous pointer and uses only a forward pointer along with a next bit or group of bits to test thereby reducing storage space for nodes.

The main concept is that a key is input, a hash function is performed on the key, a direct table (DT) is accessed, and the tree is walked through pattern search control blocks (PSCBs) and ends up with a leaf.

The problem solved is the design of a set of data structures that can be located in a few registers and regular memory, and then used to build a Patricia tree structure that can be manipulated by a relatively simple hardware macro. In the Patricia tree, both keys and corresponding information needed for retrieval are stored.

The key is the information that is to be searched on and matched. Initially, the key is placed in a register and hashed. The result is the hash key and the actual search will happen on the hash key. The hash function could be the null hash, and then the hash key will be exactly the same as the key. The hash function provides an n->n mapping of the bits of the key to the bits of the hash key.

The data structure that is used to store the hash key and the related information in the tree is called a leaf. Retrieving the leaf is the purpose of this algorithm. Each leaf corresponds to a single key that matches exactly with the input key. In this implementation the leaf contains the key, and appended to it is the additional information to be stored. The length of the leaf is programmable, as is the length of the key. The leaf is stored in random access memory and is implemented as a single memory entry. If the key is located in the direct table (DT) then it is called a direct leaf.

BRIEF DESCRIPTION OF THE DRAWINGS

The invention is better understood by reading the following detailed description of the preferred embodiment in conjunction with the accompanying drawings, wherein:

FIG. 6 illustrates the effect on exemplary data structures of using a direct table in accordance with a preferred embodiment of the invention.

FIG. 7 illustrates the effect on exemplary data structures of having direct leaves enabled in accordance with a preferred embodiment of the present invention.

FIG. 11 illustrates the internal structure of an exemplary lookup definition table in accordance with a preferred embodiment of the present invention.

FIG. 12 illustrates the internal format of a PSCB register.

FIG. 13 illustrates the fixed leaf format for FM trees.

DETAILED DESCRIPTION OF THE PREFERRED EMBODIMENT

Figure 1:
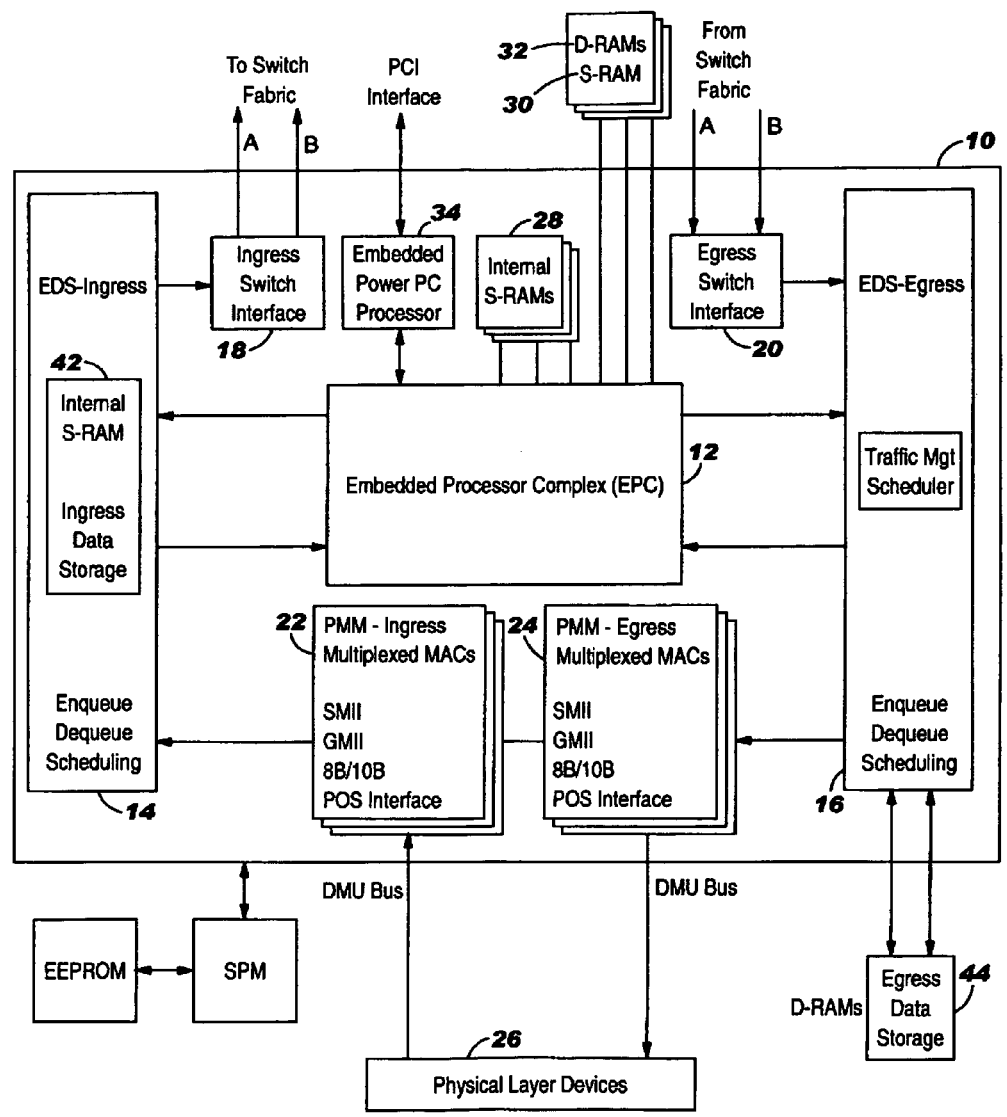
FIG. 1 illustrates an exemplary architecture for a network processor in accordance with a preferred embodiment of the present invention.

The present invention will be described in the context of a network processor in which the invention is embedded. The network processor 10 is a programmable switching and routing system on a single chip, an architecture of which is depicted in FIG. 1. It provides media interfaces for 10/100 Ethernet, Gigabit Ethernet and Packet Over SONET (POS) as well as data aligned serial links (DASL) for attachment to switch interfaces. Internal hardware accelerators increase performance and efficiency. An embedded processor complex (EPC) 12 includes protocol processors and an internal control point processor for frame processing, configuration and management support.

Up to N parallel protocol processors are available. In an embodiment of 16 protocol processors, 16,384 words of internal picocode instructions store and 32,768 words of external picocode instructions store are available to provide 2,128 million instructions per second (MIPS) of aggregate processing capability. In addition, each protocol processor has access to M hardware accelerator coprocessors which provide high speed pattern search, data manipulation, internal chip management functions, frame parsing, and data prefetching support. In a preferred embodiment control storage for the protocol processors is provided by both internal and external memories: 32K of internal static random access memory (SRAM) 28 for immediate access, external zero bus turnaround (ZBT) SRAM 30 for fast access, and external double data rate (DDR) dynamic random access memory (DRAM) 32 for large storage requirements.

Using embedded hardware accelerators in conjunction with preprocessing algorithms, operating on the attached control point processor 34, the network processor 10 is capable of processing frames through one hundred or more filter rules with complex range, priority, and action specifications at wirespeed. This makes a network processor-based system well suited for gateways, server farm applications, and filtering tasks associated with processing a mix of traffic.

Control point software provides automatic logic checking when a network administrator enters filter rules to a coherent, user-friendly interface. Using novel flow control based upon stability theory, the network processor 10 withstands higher rates of temporary oversubscription without Transmission Control Protocol (TCP) collapse than commonly-used random early discard methods. The network processor 10 also delivers differentiated services by automatically allocating bandwidth, relieving network administrators from having to predict the effects of setting dozens of thresholds on the basis of momentary or assumed traffic statistics.

A single network processor 10 provides media speed switching for up to 40 Fast Ethernet or four Gigabit Ethernet ports. It can also be configured to support OC-48c, OC-48, four OC-12 or sixteen OC-3 ports. For scalability, the two 3.5 Gbps serial DASL links can be used to interconnect two network processors to double the port density, or to attach switch fabrics to create switching solutions with up to 64 network processors. The two DASL links, one primary and one secondary, can also provide connection to a redundant switch fabric for increased system availability.

One exemplary embodiment of a network processor 10 includes the following major sections as illustrated in FIG. 1:

1. An embedded processor complex (EPC) 12 including up to 16 programmable processors plus coprocessors;
2. An enqueue-dequeue-scheduling logic 14 for frames traveling from the Ethernet physical layer devices to the switch fabric (EDS-Ingress);
3. An enqueue-dequeue-scheduling logic 16 for frames traveling from the switch fabric to the Ethernet physical layer devices (EDS-Egress);
4. An ingress switch interface (Switch Ingress) 18 and egress switch interface (Switch Egress) 20 DASL links for interconnection to another network processor or intermediate switch;
5. A physical MAC multiplexer 22 receiving frames from the Ethernet or POS physical layer devices 26 (PMM-Ingress) and the physical MAC multiplexer 24 transmitting frames to the Ethernet or POS physical layer devices 26 (PMM-Egress).

Figure 2:
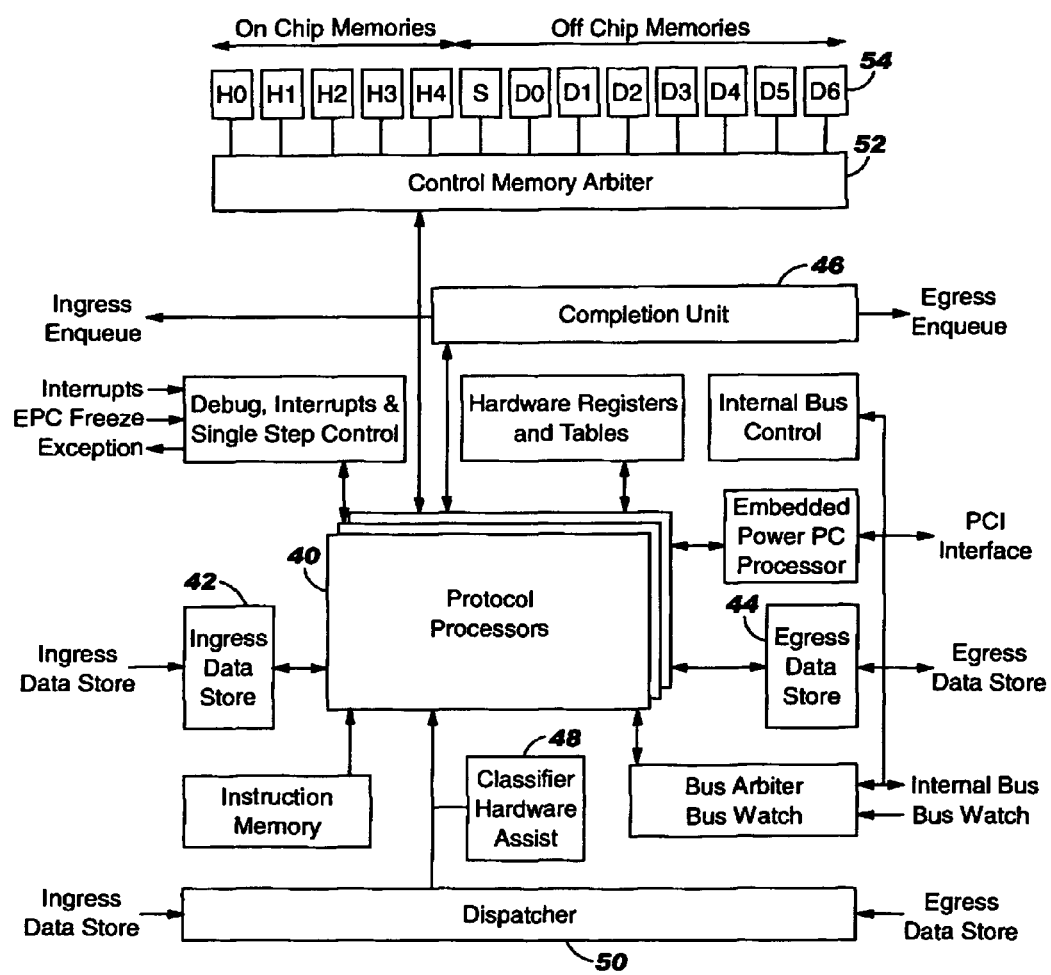
FIG. 2 illustrates an exemplary embodiment for an embedded processor complex in accordance with a preferred embodiment of the present invention.

FIG. 2 illustrates an exemplary embodiment for an embedded processor complex. It includes 16 protocol processors providing 2128 MIPS of processing power. Each protocol processor 40 includes a 3-stage pipeline (fetch, decode and execute), general purpose registers, special purpose registers, an eight instruction cache, a dedicated arithmetic logic unit (ALU) and coprocessors all running at 133 MHz. Two of the protocol processors are specialized: one for handling guided frames (the guided frame handler) and one for building look-up data in control memory (the generic tree handler).

Figure 3:
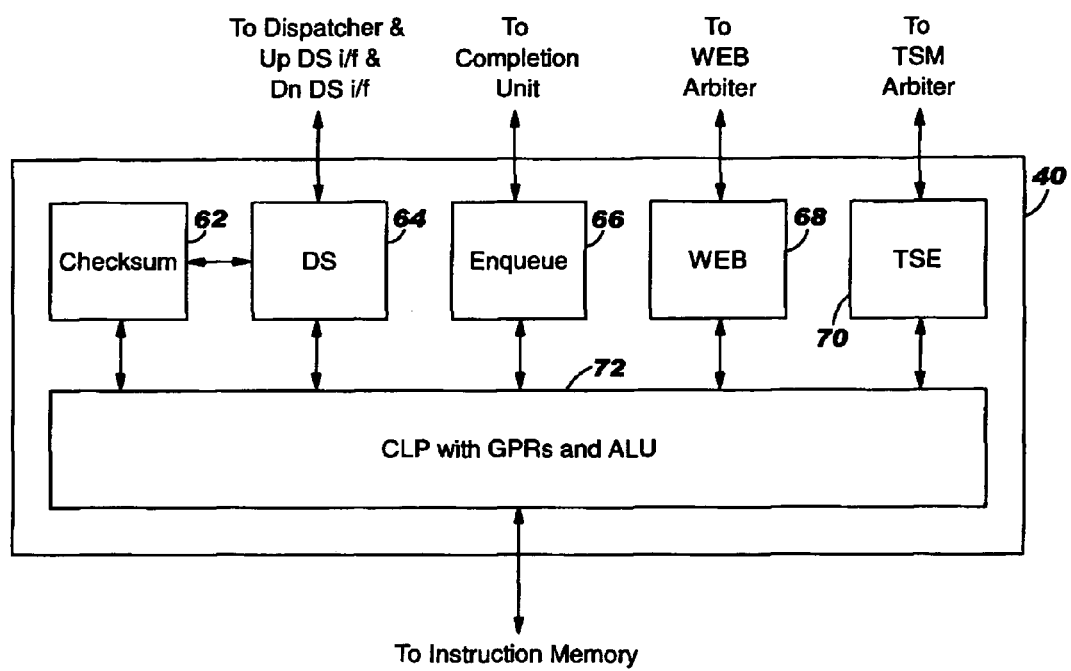
FIG. 3 illustrates an exemplary protocol processor structure in accordance with a preferred embodiment of the present invention.

FIG. 3 illustrates an exemplary embodiment of a protocol processor. The coprocessors associated with each of the programmable protocol processors 40 provide the following functions:

1. A data store coprocessor 64 interfaces frame buffer memory 42, 44 (ingress and egress directions) to provide direct memory access (DMA) capability;

2. A checksum coprocessor 62 calculates header checksums;
3. An enqueue coprocessor 66 controls access to the 256-bit working register, containing key frame parameters. This coprocessor interfaces with the completion unit 46 to enqueue frames to the switch and target port queues;
4. An interface coprocessor provides all protocol processors access to internal registers, counters and memory for debug or statistics gathering;
5. A string copy coprocessor enables efficient movement of data within the EPC;
6. A counter coprocessor manages counter updates for the protocol processors 40;
7. A policy coprocessor examines flow control information and checks for conformance with pre-allocated bandwidth.

Hardware accelerators 48 perform frame forwarding, frame filtering, frame alteration and tree searches. Other features incorporated into the network processor include innovative filter rule processing, hash functions and flow control.

The protocol processors 40 can enforce one hundred or more frame filter rules with complex range and action specifications. Filtering is essential for network security, and network processor hardware assists 48 provide wirespeed enforcement of these complex rule sets. Filter rules can deny or permit a frame or allocate quality of service (QoS) based on IP header information. Control point software for pre-processing rules automatically corrects logic errors. After a logically correct rule set has been entered, keys are formed from packet header information and are tested at wirespeed using the network processor's software managed trees.

Geometric hash functions exploit statistical structures in IP headers to outperform ideal random hashes. Consequently, the low collision rates enable high speed look-ups in full match tables without additional resolution searches.

Figure 14:
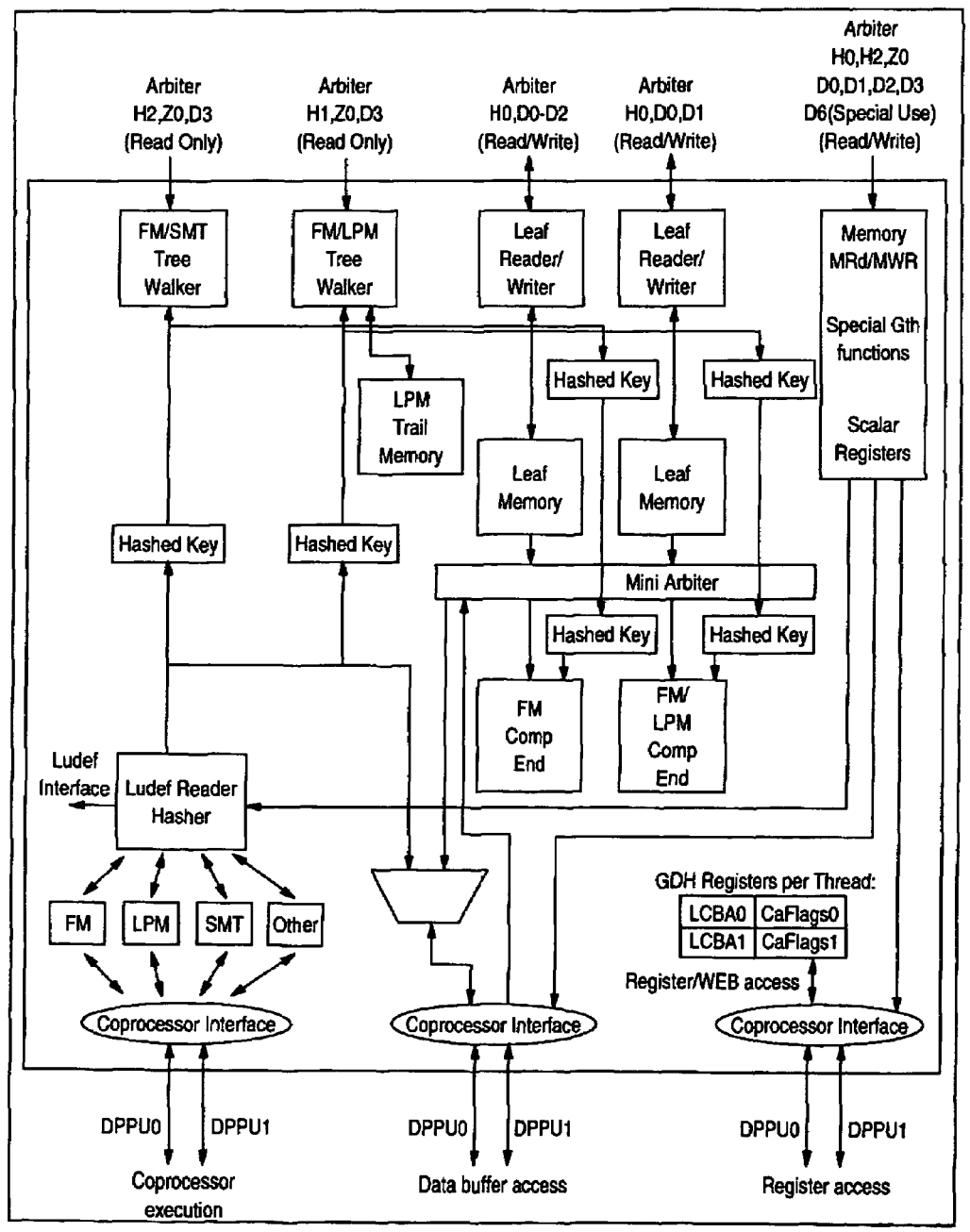
FIG. 14 illustrates an exemplary architecture for a tree search engine in accordance with a preferred embodiment of the present invention.

Operating in parallel with protocol processor execution, the tree search engine 70 performs tree search instructions (including memory read, write or read-write), memory range checking and illegal memory access notification. FIG. 14 illustrates an exemplary embodiment of a tree search engine.

Two system control options are available within the network processor 10. An internal processor 34 can function as the control point (CP) processor for the system or, alternatively, an external processor can be connected to one of the four Ethernet macros for initialization and configuration. The CP processor 34 communicates with other processor entities within the network processors by building special Ethernet frames called guided frames. Guided frames can be forwarded across the DASL links to other devices allowing one CP processor attached to a single Ethernet port to communicate with and control all of the network processor devices contained within the subsystem. The internal processor 34 of each network processor 10 can also communicate using a separate 32-bit PCI bus.

The network processor 10 usually resides on a subsystem board and provides the protocol layer(i.e., layer 2, layer 3, layer 4 and higher) frame processing. Software running on a CP processor 34 in the CP subsystem provides the management and route discovery functions. The CP code, picocode running on the protocol processors, and picocode running on the guided frame handler enable initialization of this system, maintenance of the forwarding paths, and management of the system. As a distributed system, the CP and each network processor subsystem contain multiple processors which operate in parallel and communicate using guided frames for increased efficiency and performance.

Data frames are received from the media by the PMM 22 and transferred to the data storage buffers 42. The PMM also performs CRC checking and frame validation during the receive process. The dispatcher 50 sends up to 64-bytes of frame information to an available protocol processor 40 for frame look-ups. The classifier hardware assist 48 supplies control data to identify frame formats. The protocol processor 40 uses the control data to determine the tree search algorithm to apply including fixed match trees, longest prefix match trees, or software managed trees.

Look-up is performed with the aid of a tree search engine (TSE) 70. The TSE 70 performs control memory 72 accesses, enabling the protocol processor 40 to continue execution. The control memory 72 stores all tables, counters and any other data needed by the picocode. For efficiency, a control memory arbiter 52 manages control memory operations by allocating memory cycles between the protocol processors 40 and a variety of on-chip and off-chip control memory options 54.

The protocol processor 40 contains a primary data buffer, a scratch pad data buffer and control registers (collectively, 72) for data store operations. Once a match is found, ingress frame alterations, such as VLAN header insertion or overlay, can be applied. These alterations are not performed by the EPC 12. Instead, the ingress switch interface hardware 18 performs the alteration if the hardware flags are set. Other frame alterations can be accomplished by the picocode and the data store coprocessor 64 by modifying the frame contents held in the ingress data store 42.

Control data is gathered and used to build switch headers and frame headers prior to sending frames to the switch fabric. Control data includes switch information such as the destination of the frame, as well as information for the egress network processor, to help it expedite frame look-up of destination ports, multicast or unicast operations, and egress frame alterations.

Figure 4:
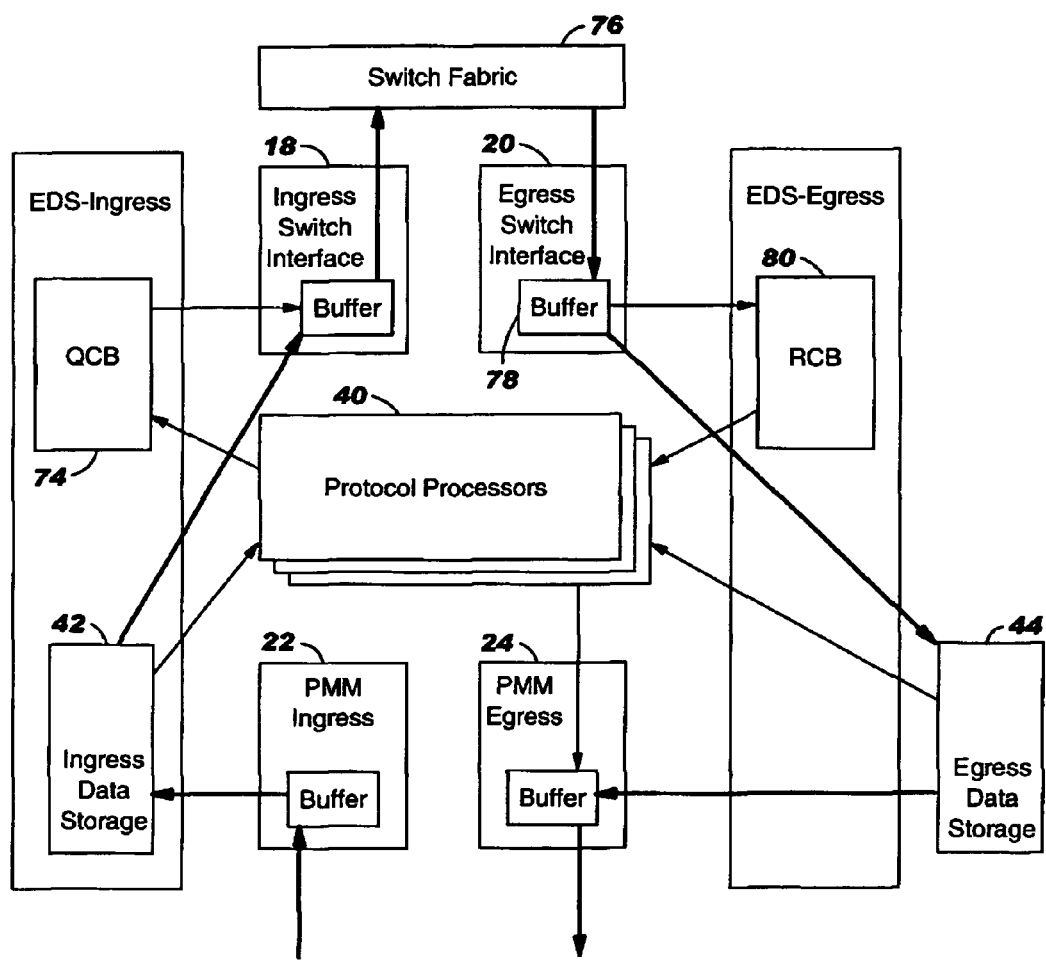
FIG. 4 illustrates exemplary ingress and egress frame flows in accordance with a preferred embodiment of the present invention.

FIG. 4 illustrates exemplary ingress and egress frame flows. Upon completion, the enqueue coprocessor 66 builds the necessary formats for enqueuing the frame to the queue control block (QCB) 74 and forwards them to the completion unit 46. The completion unit 46 guarantees frame order from the up to 16 protocol processors 40 to the switch fabric queues 76. Frames from the switch fabric queues 76 are segmented into 64-byte cells with switch header and frame header bytes inserted as they are transmitted by the switch fabric 76.

Frames received from the switch fabric 76 are placed in egress data store buffers 78 using information provided by the reassembly control block (RCB) 80 and the EDS-Egress 44 and are enqueued to the EPC 12. A portion of the frame is sent by the dispatcher 50 to any idle protocol processor 40 for performing the frame look-ups. Frame data is dispatched to the protocol processor 40 along with data from the classifier hardware assist 48. The classifier hardware assist 48 uses frame control data created by the ingress network processor to help determine the beginning instruction address for egress processing.

Egress tree searches support the same algorithms as are supported for ingress searches. Look-up is performed with the TSE 70, freeing the protocol processor 40 to continue execution. All control memory operations are managed by the control memory arbiter 52, which allocates memory access among the processor complexes.

Egress frame data is accessed through the data store coprocessor 64. The results of a successful look-up contains forwarding information and, in some cases, frame alteration information. Egress frame alterations can include VLAN header deletion, time to live increment (IPX) or decrement (IP), IP header checksum recalculation, Ethernet frame CRC overlay and MAC destination address or source address overlay or insertion. IP header checksums are prepared by the checksum coprocessor 62. Alterations are not performed by the embedded processor complex 12, but rather hardware flags are created and PMM egress hardware 24 performs the alterations. Upon completion, the enqueue coprocessor 46 is used to build the necessary formats for enqueuing the frame in the EDS egress queues 44 and forwards them to the completion unit 46. The completion unit 46 guarantees frame order from the up to 16 protocol processors to the EDS egress queues 44 feeding the egress Ethernet MACs. The completed frames are finally sent by the PMM egress hardware 24 to the Ethernet MACs or the POS interface and out the physical ports.

Figure 5:
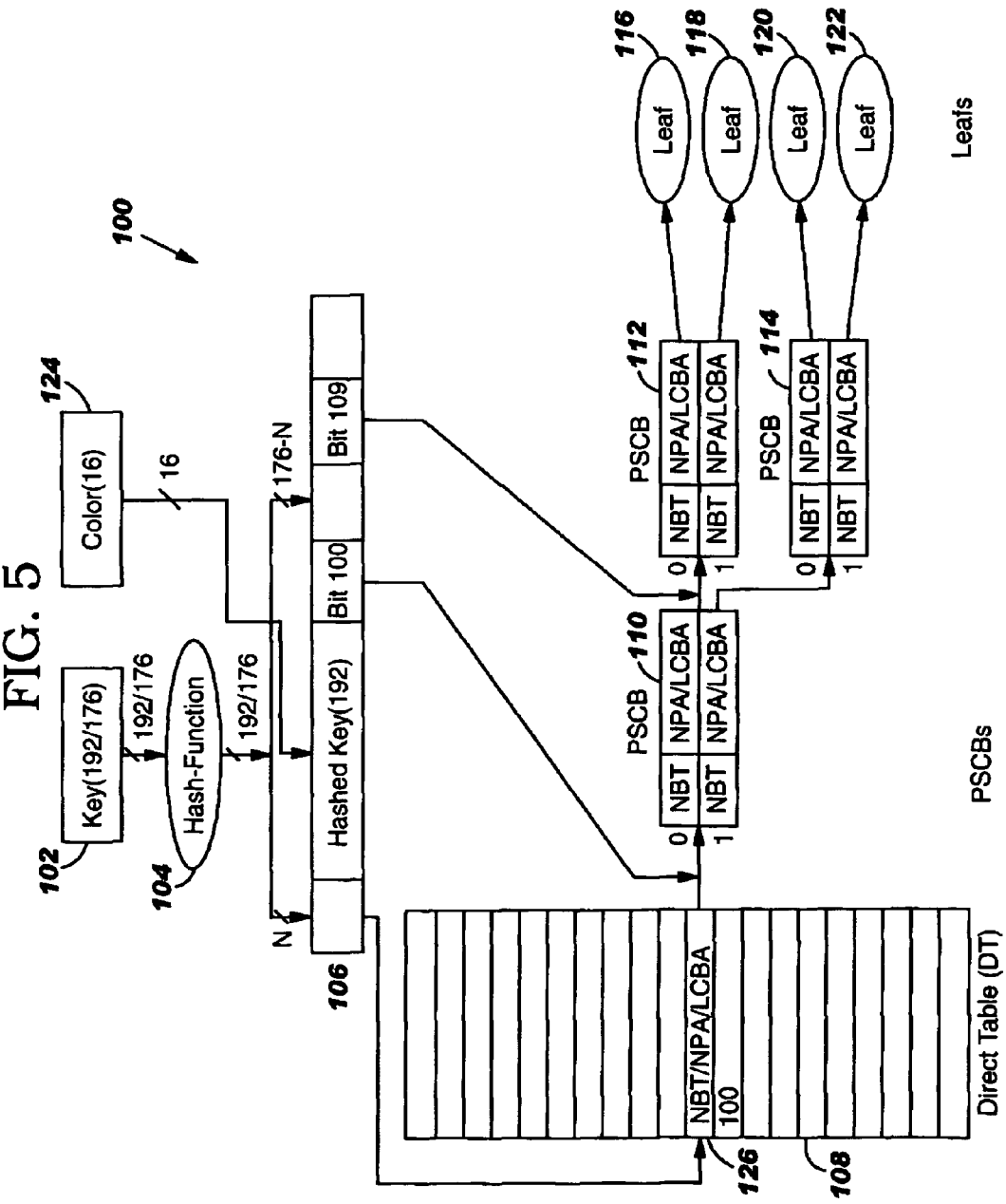
FIG. 5 illustrates a tree data structure for the full match search algorithm in accordance with a preferred embodiment of the present invention.

The tree search engine (TSE) 70 as depicted in FIG. 14 uses the concept of trees to store and retrieve information. Retrieval, i.e., tree-searches as well as inserts and deletes are done based on a key, which is a bit-pattern such as, for example, a MAC source address, or the concatenation of an IP source address and an IP destination address. An exemplary tree data structure 100 for use in the present invention is depicted in FIG. 5. Information is stored in a control block called a leaf 116, 118, 120, 122, which contains at least the key 102 (the stored bit pattern is actually the hashed key 106). A leaf can also contain additional information such as aging information, or user information, which can be forwarding information such as target blade and target port numbers. The format of a leaf is defined by picocode; the object is placed into an internal or external control store.

The search algorithm for trees operates on input parameters including the key 102, performs a hash 104 on the key, accesses a direct table (DT) 108, walks the tree through pattern search control blocks (PSCBs) 110, 112, 114 and ends up at a leaf 116, 118, 120, 122. Each type of tree has its own search algorithm causing the tree-walk to occur according to different rules. For example, for fixed match (FM) trees, the data structure is a Patricia tree. When a leaf has been found, this leaf is the only possible candidate that can match the input key 102. A "compare at the end" operation compares the input key 102 with the pattern stored in the leaf. This verifies if the leaf really matches the input key 102. The result of this search will be success (OK) when the leaf has been found and a match has occurred, or failure (KO) in all other cases.

The input to a search operation contains the following parameters:

key The 176 bit key must be built using special picocode instructions prior to the search or insert/delete. There is only one key register. However, after the tree search has started, the key register can be used by the picocode to build the key for the next search concurrently with the TSE 70 performing the search. This is because the TSE 70 hashes the key and stores the result in an internal 192 bit HashedKey register 106.

key length This 8 bit register contains the key length minus one bit. It is automatically updated by the hardware during the building of the key.

LUDefIndex This is an 8 bit index into the lookup definition table (LUDefTable), which contains a full definition of the tree in which the search occurs. The internal structure of the LUDefTable is illustrated in FIG. 11.

TSRNr The search results can be stored either in 1 bit Tree Search Result Areas TSR0 or TSR1. This is specified by TSRNr. While the TSE is searching, the picocode can access the other TSR to analyze the results of a previous search.

color For trees which have color enabled (specified in the LUDefTable), the contents of a 16 bit color register 124 is inserted in the key during the hash operation.

For FM trees, the input key will be hashed into a HashedKey 106, as shown in FIG. 4. There are several fixed algorithms available. The algorithm that will be used is specified in the LUDefTable.

The lookup definition table is the main structure which manages tree search memory. The LUDefTable is an internal memory structure and contains 128 entries for creating trees. The LUDefTable contains entries that define the physical memory the tree exists in (e.g., DRAM, SRAM, internal RAM), whether caching is enabled, the size of the key and leaf, and the type of search action to perform. The LUDefTable is implemented as three separate random access memories—one RAM that is accessible only by the general processor tree handler (GTH) and two RAMs that are duplicates of each other and are accessible by all picoprocessors.

The output of the hash function 104 is always a 176-bit number which has the property that there is a one-to-one correspondence between the original input key 102 and the output of the hash function 104. As will be explained below, this property minimizes the depth of the tree that starts after the direct table 108.

If colors are enabled for the tree, which is the case in the example of FIG. 4, the 16-bit color register 124 is inserted in the 176-bit hash function output and the file result is a 192-bit number, called the HashedKey 106. The insertion occurs directly after the direct table 108. If the direct table 108 contains $2^N$ entries, then the 16-bit color value is inserted at bit position N, as shown in FIG. 4. The output of the hash function, together with the inserted color value, is stored in the HashedKey register 106. If colors are disabled for a tree, the 176-bit hash function is taken unmodified, and 16 zeros are appended to the hash output to produce the 192-bit final HashedKey.

Colors can be used to share a single direct table 108 among multiple independent trees. For example, one use of a color could be a VLAN ID in a MAC source address (SA) table. In this case, the input key 102 would be the MAC SA, and the color 124 would be the VLAN ID (since the VLAN ID is 12 bits, four bits of the color would be unused, i.e., set to zero). After the hash function 104, the pattern used is 48+16=64 bits. The color is now part of the pattern and will distinguish between MAC addresses of different VLANs.

The hash function 104 is defined such that most entropy in its output resides in the highest bits. The N highest bits of the HashedKey register 106 are used to calculate an index into the direct table (DT) 108.

The first structure that implements the tree is called the direct table (DT) 108. Each entry in a DT table with N elements corresponds to a key whose first $\log_2 N$ bits are the same as the index of that entry in the DT table, in binary form. For example, the $5^{th}$ entry in an 16 entry DT table would correspond to keys whose first 3 bits are "0101". If there are no leaves that correspond to a key with the first $\log_2 N$ bits the same as the index in the DT, then that entry is marked as empty. If there is only a single leaf that matches those bits, then inside that entry there is a pointer to a leaf. This pointer is the address in the memory that the leaf is stored. If there is more than one leaf that corresponds to keys with the same first bits, then the DT entry points to a PSCB structure 110, and also contains the next bit(s) to test (NBT) field 126. These two structures will be described below.

The DT table 108 is implemented in memory, and its size (length) and starting point are programmable. Another programmable feature is the use of what are called direct leaves. Instead of having the DT entry point to a leaf, which then must be read afterwards, the leaf can be stored in the location of the DT entry. This is called a direct leaf. The problem with this is, of course, a tradeoff in speed with the use of more memory for the DT entry. The memory size (its width) must be enough to accommodate a leaf, and not all of the DT entries will have leaves stored in them. However, a good hash function of the key could result in most of the leaves being attached to a single DT entry, so the speed tradeoff could be big.

In summary, a DT entry can be empty. In this case, no leaves are attached to this DT entry. The DT entry can point to a single leaf attached to this DT entry. In this case, the DT entry can point to a pattern search control block (PSCB) and also contain the next bit(s) to test (NBT) for that PSCB. There is more than one leaf attached to this DT entry. Finally, the DT entry can contain a direct leaf.

A PSCB represents a branch in the tree. In the preferred embodiment there is a 0-branch and a 1-branch. The number of branches emanating from a PSCB is variable depending on the number of bits used to designate the branches. If n bits are used, then $2^n$ branches are defined at the PSCB. Each PSCB is also associated with a bit position p. All leaves that can be reached from the PSCB through the 0-branch have a '0' at position p in the pattern, and the leaves that can be reached through the 1-branch have a '1' at position p. Furthermore, all leaves that can be reached from a PSCB will always have patterns at which bits 0 . . . p−1 are identical, i.e., the patterns start to differ at position p. The bit position associated with a PSCB is stored in the previous PSCB or in a DT entry and is called the NBT (i.e., next bit to test). The format of a PSCB entry is the same as the format of a DT entry. It is implemented in random access memory.

Thus, PSCBs are only inserted in the tree at positions where leaf patterns differ. This allows efficient search operations since the number of PSCBs, and thus the search performance, depends only on the number of leaves in a tree and not on the length of the patterns. The PSCB register format is depicted in FIG. 12.

In summary, a PSCB entry can be empty, can point to a leaf, or can point to another PSCB, and also contain the next bit to test (NBT) for that PSCB. FM PSCBs always have a shape defined by a width of one and a height of one, as described further below.

A PSCB can represent a branch that corresponds to more than one bit. In this case, for example, a PSCB that correspond to 2 bits would have four PSCB entries, a 00 branch entry, a 01 branch entry, a 10 branch entry and a 11 branch entry. Each tree can have PSCBs that correspond to a different number of bits. In this case, the previous PSCB will also have the number of bits that correspond to the next PSCB, as well as the bit number that these bits represent.

In the actual implementation, the key is inserted in a special key register 102. It is then hashed 104, and the results are stored in a hashed key register 106. The hash function 104 is programmable, and one of the functions is the null hash function (i.e., no hash). The first n bits of the hashed key are used as an index to the DT table 108. One programmable feature is the insertion of a bit vector right after the bits used to index in the DT entry. This bit vector is called a "color" value (register 124), and the result of the hashed key and the inserted color value is stored inside the hashed key register 106.

The format of a leaf in a FM tree contains control information including a pattern. The pattern identifies the leaf as unique in the tree. A leaf also contains the data needed by the application that initiated the tree search. The data contained in a leaf is application dependent and its size or memory requirements are defined by the LUDefTable entry for the tree. FIG. 13 illustrates the fixed leaf format for FM trees.

The steps in processing the DT entry are as follows:

The DT entry is read from memory.

If the DT entry is a null entry, this means that there are no leaves in the tree that have the same first "n" bits as the hashed key, so the search fails.

If the DT entry has a pointer to a leaf, then the leaf is read from memory using the pointer from the DT 108 as the address of the leaf. The leaf is stored in a register and is compared with the key. This step is called compare at the end. If there is a full match, the tree search succeeds. Otherwise, the tree search fails.

If the DT entry has a pointer to a PSCB 110 and an NBT, the NBT is first stored in a specific register. Then the NBT number is used to find the bit in the key in location NBT. That bit (0 or 1) is used along with the pointer to the PSCB to extract the correct PSCB entry: the bit is appended at the end of the pointer and that gives the full address in memory of the PSCB. The PSCB is read and stored in a specific register; the hardware then processes the PSCB entry. At this point, the algorithm is starting to walk down the tree.

The steps in processing the PSCB entry are as follows:

If the PSCB entry is a null entry, this means that there are no leaves in the tree that have the same first NBT bits as the key, so the search fails.

If the PSCB has a pointer to a leaf, then the leaf is read from memory using the pointer from the PSCB as the address of the leaf. The leaf is stored in a register and is compared with the key. This step is called compare at the end. If there is a full match, the tree search succeeds. Otherwise, the tree search fails.

If the PSCB has a pointer to a PSCB and an NBT, the NBT is first stored to the specific register, and this becomes the current NBT. Then this NBT number is used to find the bit in the key in location NBT. That bit (0 or 1) is used along with the pointer to the PSCB to extract the correct next PSCB entry. The bit is appended at the end of the pointer and gives the full address in memory of the PSCB. The PSCB is read and stored in the specific register. Then the hardware will repeat this processing of a PSCB entry.

During the tree walk, not all bits of the leaf are tested, but only those bits for which there is a PSCB (branch in the tree). Therefore, once a leaf has been found, the pattern of the leaf must be compared with the key, to make sure that all bits match. This is the reason for the compare-at-the-end operation of the algorithm. Success or failure of the search is marked by an OK/KO flag, along with a completion flag. When the completion flag is triggered, the program or hardware that uses this FM tree search engine can examine the OK/KO flag.

Everything that is described as "programmable" can be set in a specific register value that corresponds to that tree. If the engine needs to support N trees, then N of these values are placed in a register array. In this register are encoded the programmable values, i.e., the hash function to use, the beginning of the DT table, its size, etc.

One capability of the hardware is an automatic insert (a hardware insert) of a key. As the search for the (hashed) key proceeds, when there is a mismatch (KO), the leaf can be automatically inserted at that point by using the hardware to create the PSCB on the fly. In this case, the concept of the full match tree can be used as a cache.

The search starts with an access into the direct table 108, i.e., a DT entry is read from the direct table 108. The address used to read the DT entry is calculated from the N highest bits of the HashedKey, as well as on tree-properties as defined in the lookup definition table (LUDefTable). The DT entry can be seen as the root of a tree. The actual tree data structure depends on the tree-type. A Patricia tree data structure is used for FM trees, and extensions to Patricia trees are used for LPM and SMT trees.

An example of the use of an 8 entry DT 108 is shown in FIG. 6. It can be seen that the search time, i.e., the number of PSCBs that must be accessed, can be reduced by using a DT 108. Thus, by increasing the DT size, a trade-off can be made S between memory usage and search performance.

For performance reasons, it is inefficient to read a DT entry only to find that it contains a pointer to a leaf, after which the leaf itself must be read. This situation will occur very often for FM trees, which have many single leaf entries per DT entry. The concept of a direct leaf allows a trade-off between more memory usage and better performance.

A tree can have direct leaves enabled, which is specified in the lookup definition table (LUDefTable). The difference between trees with direct leaves enabled and disabled is illustrated in FIG. 7. When direct leaves are enabled and a DT entry contains a single leaf, this leaf 130 is stored directly in the DT entry itself. Otherwise, the DT entry will contain a pointer to the leaf.

Shaping is a feature of the tree search memory (TSM) and is used to specify how an object, like a leaf or PSCB, is stored in the TSM. The shape is defined by the parameters width and height. The height of an object denotes the number of consecutive address locations at which the object is stored. The width of an object denotes the number of consecutive banks at which the object is stored. For width and height, the hardware automatically reads the appropriate number of locations. From a picocode point of view, an object is an atomic unit of access. The width must always be 1 for objects stored in SRAM. The width may be greater than 1 for objects in DRAM. Objects that are small enough to fit within a single memory location are defined to have a height of one and a width of one. The shape of a DT entry with direct leaves disabled is always (W=1, H=1). When the DT entry is stored in dynamic random access memory (DRAM), it occupies exactly 64-bits. The shape of a DT entry with direct leaves enabled equals the shape of the leaf, which is specified in the LUDefTable. In general, this causes more memory to be used by the DT 108. It also causes an impact of the leaf shape on the DT entry address calculation.

After a DT entry has been read and assuming the DT entry does not contain a direct leaf nor is it empty, the search continues by walking the tree that starts at the DT entry. The tree-walk may pass several PSCBs (pattern search control blocks), until a leaf has been reached.

When a PSCB is encountered during a search in an FM tree, the tree search engine hardware 70 will continue the tree-walk on the 0-branch or the 1-branch, depending on the value of bit p of the HashedKey.

During a tree walk, not all bits of the HashedKey are tested, but only those bits for which there is a PSCB. Therefore, when a leaf has been found, the pattern in the leaf must still be compared with the HashedKey to make sure that all bits match. Note that it is the HashedKey that is stored in the leaf and not the original input key. When an FM leaf is found, the following operations are performed:

Step 1: The leaf pattern is compared with the HashedKey. When a match occurs, the operation proceeds with Step 2. Otherwise, if the leaf contains a chain-pointer to another leaf, this leaf is read and the pattern is compared again with the HashedKey. Without a match and without an NLA field, the search ends with failure (KO).

Step 2: If a vector mask is enabled, the bit with number VectorIndex is read from the leaf's vector mask. This bit is returned as part of the search result. The search ends with success (OK).

Figure 10:
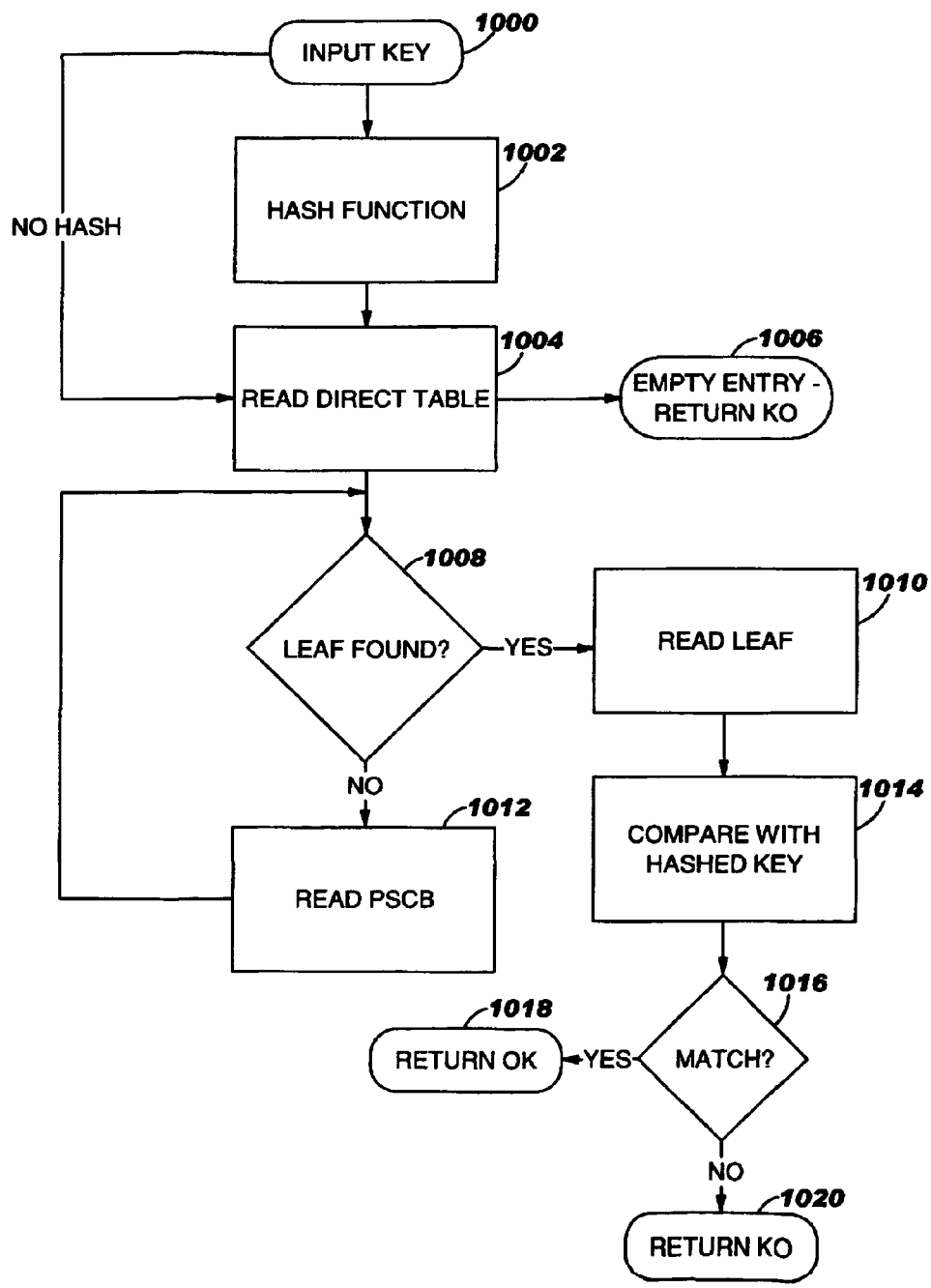
FIG. 10 illustrates the processing logic of the Full Match (FM) search algorithm in accordance with a preferred embodiment of the present invention.

FIG. 10 illustrates the processing logic of the Full Match search algorithm of the present invention. Processing starts in logic block 1000 with reading of an input key. The input key is then run through a hash function as indicated in logic block 1002. Hashing at the input key into a hashed key is an option. The hash function is chosen such that the entropy is highest at the leftmost bits of the hashed key, i.e., those bits that are used to address a direct table. The hash function is reversible, i.e., there exists a reverse hash function that can transform the hashed key into the input key. Next, in logic block 1004, the direct table if read. The upper N bits (whereby N is configurable) of the hashed key are used as an index into the direct table. When the entry that has been read is empty, the search returns KO (no match found). This is indicated by termination block 1006. As indicated in decision block 1008, a determination is made as to whether or not the entry points to a leaf. If the DT entry points to a leaf, then as indicated in logic block 1010 the leaf is read. Otherwise, the DT entry points to a PSCB. In this case, the appropriate part of a PSCB is read as indicated in logic block 1012. For a full match search, a PSCB includes two entries: a 0-part and a 1-part. The previous PSCB (or DT entry) contains a bit number (NBT: next bit to test). The NBT selects a bit in the hashed key (i.e., 0 or 1) which selects which PSCB entry to use. The PSCB entry either contains a pointer to a leaf, or a pointer to another PSCB. Processing then loops back to decision block 1008. Once a leaf is found in decision block 1008, and read in logic block 1010, the pattern stored in the leaf is compared bit-wise with the hashed key as indicated by logic block 1014. If all bits match, as indicated in decision block 1016, the search returns OK (successful match) as indicated in termination block 1018. The contents of the leaf is then passed to the application. Otherwise, the search returns KO (failure) as indicated in termination block 1020. As an extension to this processing logic, a PSCB may consists of $2^b$ entries, such that b bits from the hashed key select which entry to read from the PSCB. This increases performance at a cost of more memory usage.

A cache can be used for increasing the search performance in trees. Use of a cache can be enabled in the LUDefTable on a per tree basis. During a search, the tree search engine 70 will first check in the cache to determine if a leaf is present that matches the HashedKey. If such a leaf is found, it is returned and no further search is required. If such a leaf is not found, a normal search starts.

For the tree search engine hardware 70, a cache look-up is exactly identical with a normal search. Thus, the input key is hashed into a HashedKey, and a direct table 108 access is performed. The direct table 108 acts as a cache. When the cache search returns OK (success), the search ends. Otherwise, the tree search engine 70 starts a second search in the full tree—except that no hash operation is performed. The contents of the HashedKey register 106 are reused.

It can be specified in the LUDefTable if a cache search is used. If a cache search uses LUDefTable entry I and the search ends KO (failure), another search using LUDefTable entry I+1 starts automatically. In principle, this allows multiple searches to be chained, although it is recommended that the full tree be stored under LUDefTable entry I+1.

The tree search engine 70 provides hardware search operations in FM trees, LPM trees and SMT trees. For all tree types varying amounts of software are required to initialize and maintain a tree. Only FM trees and LPM trees have the capability that insertion and removal of leaves can be done without the intervention of control point processor 34. The use of this feature allows for a scalable configuration and still has the flexibility to allow the CP 34 to insert or remove leaves if needed.

FM trees provide a mechanism for searching tables efficiently with fixed sized patterns. An example of this would be a layer-2 Ethernet unicast MAC table. Ethernet unicast MAC addresses are a fixed six bytes and must have an exact match, otherwise, the destination is unknown.

FM trees are the best performing trees since they benefit significantly from the hashing function. The tree search engine provides multiple fixed hashing functions that offer very low collision rates. Assuming that the DT 108 is large enough, the probability of having multiple leaves associated with a single DT entry is very low. This is the 1+ epsilon rule, whereby epsilon represents the number of collisions in a DT entry. A DT entry with one leaf has an epsilon=0. Thus, with the hashing functions and using FM trees, the value of epsilon should be very small.

Figures 8, 9:
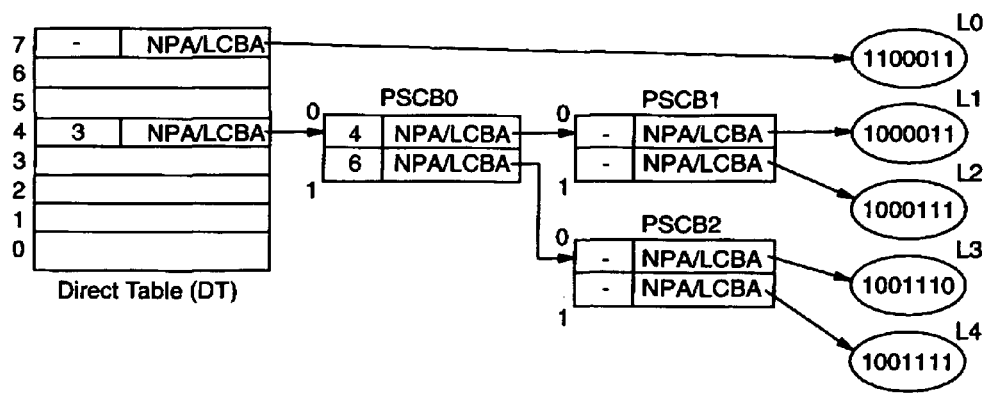
FIG. 8 illustrates an exemplary structure of a DT entry and pattern search control block (PSCB) line formats in a Full Match search tree in accordance with a preferred embodiment of the present invention.
FIG. 9 illustrates an example of a search using a Full Match search in accordance with a preferred embodiment of the present invention.

The structure of a DT entry in an FM tree can be seen in FIG. 8. Each DT entry is 36-bits wide and contains one of the following formats:

Empty DT entry. There are no leaves associated with this DT entry.

Pointer to next PSCB. The DT entry contains a pointer to a PSCB. The next PSCB address (NPA) and next bit to test (NBT) fields are valid.

Pointer to leaf. There is a single leaf associated with the DT entry. The leaf control block address (LCBA) contains the pointer to this leaf.

Direct leaf. There is a single leaf associated with a DT entry and the leaf is stored in the DT entry itself. The first field of a leaf must be the NLA rope, which implies that direct leaves must have the rope enabled. A rope is a circular linked list that is used to link leaves in a tree together. Picocode can "walk the rope" or sequentially inspect all leaves in a rope. It should be noted that the first two bits in the NLA are reserved to denote '10' such that they automatically encode "direct". direct leaves will only be used for a given tree if this is enabled in the LUDefTable.

FM PSCBs have the same structure as an FM DT entry except that they consists of two PSCB lines, whereby each PSCB line can have one of the two formats shown in FIG. 8. The two PSCB lines are allocated consecutively in memory and are used as a branch for walking the tree. The next bit to test (NBT) field signifies the offset into the key to use as the bit comparison for walking the PSCBs and denotes which of the two PSCB lines to use.

An example of searching a FM tree can be seen in FIG. 9 where a 7-bit value is stored in the tree. The example is simplified by using the three most significant bits (MSB) of the key as a hash into the FM DT 108. There are five leaf entries (L0–L4) stored in this tree.

As a first example, assume a binary input key of 1110011. The first three bits '111' index into DT entry 7, where an LCBA pointing to leaf L0 is present. The leaf L0 is read by the TSE 70 and the pattern in L0 is compared with the input pattern. In this example, an exact match occurs and the TSE will return OK (success).

Assume now an input pattern of 1001110. DT entry 4 contains a pointer to PSCB0 with an NBT field of 3. This means that the fourth bit in the key, '1' (bit 0 is the MSB or leftmost bit), determines which branch of the tree is taken. Since the fourth bit is a '1', the bottom half of PSCB0 is used; had it been a '0', the upper half of PSCB0 would have been used. Each PSCB is essentially a two element array of PSCB lines where an NBT value of '0' indexes into the first element and an NBT value of '1' indexes into the second element. Thus, the search continues because PSCB line 1 of PSCB0 contains an NBT of 6 and a next PSCB address (NPA) pointing to PSCB2. With an NBT of 7 and bit 7 of the input pattern equaling '0', the upper half of PSCB2 is used containing a pointer to L3. Reading leaf L3 and performing the full compare operation of the pattern in L3 with the input pattern returns an OK (success).

A search on the input pattern 1001100 will follow exactly the same path in the tree as in the previous example, but the compare at the end operation will not match, such that the search will return a KO (failure).

The present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which when loaded in a computer system, is able to carry out these methods.

Computer program instructions or computer program in the present context mean any expression, in any language, code (i.e., picocode instructions)or notation, of a set of instructions intended to cause a system having an information processing capability to perform a particular function either directly or after either or both of the following occur: a) conversion to another language, code or notation; b) reproduction in a different material form.

Those skilled in the art will appreciate that many modifications to the preferred embodiment of the present invention are possible without departing from the spirit and scope of the present invention. In addition, it is possible to use some of the features of the present invention without the corresponding use of other features. Accordingly, the foregoing description of the preferred embodiment is provided for the purpose of illustrating the principles of the principles of the present invention and not in limitation thereof, since the scope of the present invention is defined solely by the appended claims.

What is claimed is:

1. A computer system comprising:
 a computer readable medium containing a plurality of data structures, for finding a match for a variable length search key, said data structure including:
  a first pattern;
  a direct table stores a first address location for a search tree;

a plurality of pattern search control blocks wherein pattern search control block represents a branch in the search tree;

a plurality of leaves wherein each leaf is an address location for storing predefined information relative to said first pattern; and a search tree engine to correlate the first pattern with information stored in selected ones of the plurality of data structures and forward the predefined information found in a leaf included in the selected ones of the plurality of data structure if a match occurs between the first pattern and a second pattern stored in said leaf wherein a format for the direct table includes at least one of the search control block including a next pattern address points to a next pattern search control block, a leaf control block address points to one of the plurality of leaves, a next bit or bits to test and a direct leaf.

2. A computer system comprising a computer readable medium containing a plurality of data structures for finding the match of claim 1 further comprising a lookup definition table that manages a tree search memory.

3. A computer system comprising a computer readable medium containing a plurality of data structures for finding the match of claim 2 wherein the lookup definition table comprises entries that define a physical memory that the tree resides in, a size of the key and leaf, and a type of search to be performed.

4. A computer system comprising a computer readable medium containing a plurality of data structures for finding the match of claim 2 wherein the lookup definition table is implemented in a plurality of memories.

5. A computer system comprising a computer readable medium containing a plurality of data structures for finding the match of claim 1 wherein a format for a pattern search control block includes at least one of a search control block; a next pattern address that point to a next pattern search control block; a leaf control block address that points to a leaf or result; and a next bit or bits to test.

6. A computer system comprising a computer readable medium containing a plurality of data structures for finding the match of claim 1 wherein a leaf data structure includes at least one of a leaf chaining pointer; a prefix length; a pattern to be compared to the search key; and variable user data.

7. A computer system comprising a computer readable medium containing a plurality of data structures for finding the match of claim 1 wherein the direct leaf is stored directly in a direct table entry and includes a search control block and a pattern to be compared to a search key.

8. A computer system comprising a computer readable medium containing a plurality of data structures for finding the match of claim 1 wherein a pattern search control block is inserted in the search tree at a position where the leaf patterns differ.

9. A computer system comprising a computer readable medium containing a plurality of data structures for finding the match of claim 1 wherein a pattern search control block has a shape defined by a width of one and a height of one and is stored in a memory that has a line length of at least 36 bits.

* * * * *